United States Patent [19]

Isaacson

[11] 4,231,919
[45] Nov. 4, 1980

[54] SUSPENSION POLYMERIZATION OF STYRENE MONOMERS IN THE PRESENCE OF CARBON BLACK

[75] Inventor: Henry V. Isaacson, Webster, N.Y.

[73] Assignee: Eastman Kodak Company, Rochester, N.Y.

[21] Appl. No.: 15,266

[22] Filed: Feb. 26, 1979

Related U.S. Application Data

[63] Continuation of Ser. No. 831,572, Sep. 8, 1977, abandoned.

[51] Int. Cl.$^3$ .................................................. C08J 3/20
[52] U.S. Cl. ............................... 260/42.53; 260/42.43
[58] Field of Search ..................................... 260/42.53

[56] References Cited

U.S. PATENT DOCUMENTS

| | | | |
|---|---|---|---|
| 3,117,943 | 1/1964 | Corbiere et al. | 260/42.53 |
| 3,166,541 | 1/1965 | Orzechowski et al. | 526/168 |
| 3,179,648 | 4/1965 | Casale et al. | 260/42.53 |
| 3,502,582 | 3/1970 | Clemens et al. | 620/42.53 |
| 3,634,251 | 1/1972 | Maeda et al. | 260/42.53 |
| 4,014,844 | 3/1977 | Vidal et al. | 260/31.2 R |
| 4,071,670 | 1/1978 | Vanzo et al. | 260/42.53 |
| 4,148,741 | 4/1979 | Bayley | 260/42.53 |

FOREIGN PATENT DOCUMENTS 1421529  1/1976  United Kingdom .................. 260/42.53

*Primary Examiner*—Lewis T. Jacobs
*Attorney, Agent, or Firm*—William T. French

[57] ABSTRACT

A suspension polymerization process for polymerizing a styrene-containing monomer composition in the presence of untreated carbon black to produce a polymer comprising more than 40 weight percent of styrene moiety is described. The monomer composition comprises at least one styrene monomer having a substituent with a Hammett sigma value more positive than about 0.06.

4 Claims, No Drawings

SUSPENSION POLYMERIZATION OF STYRENE MONOMERS IN THE PRESENCE OF CARBON BLACK

This is a continuation of application Ser. No. 831,572, filed Sept. 8, 1977, now abandoned.

FIELD OF THE INVENTION

This invention relates to methods for manufacturing electrographic toners and particularly to a method for the suspension polymerization of styrene monomers in the presence of untreated carbon.

BACKGROUND OF THE INVENTION

Generally, electrographic toners have been prepared by compounding a polymer resin, a colorant such as a pigment or dye, and other additives, if desired, on a heated roll mill to thoroughly mix the materials. After cooling the resulting mixture is ground into fine particles to obtain usable toner. Another method that has been suggested is to dissolve the polymer resin in a solvent, mix in the colorant and other desired additives, and spray dry the resultant solvent mixture to obtain usable toner particles. In each of these methods for manufacturing toner, the resin is first polymerized, then colorant and other additives are mixed with the polymer, and finally the mixture is treated to produce fine particles of solid toner for use. It has been suggested that by combining the colorant and additives with monomers prior to or during the polymerization of the resin, usable toner particles could be prepared as the end product of the polymerization and further processing steps eliminated.

A particularly useful electrographic toner comprises a resin having a high styrene content and carbon black as a pigment. Therefore, it is desirable to polymerize styrene monomers in the presence of carbon black to produce styrene containing electrographic toners without additional processing steps.

In this regard, British Pat. No. 1,237,095 published June 30, 1971, describes a process in which styrene and n-butyl methacrylate are emulsion polymerized in the presence of carbon black. The resulting polymerized emulsion is then spray dried to obtain toner particles of usable size for electrography.

It is desirable to make polymers containing high quantities of styrene moiety, i.e., 40 weight percent and greater, by suspension polymerization in the presence of untreated carbon because the suspension polymerization beads can be made of appropriate size for useful electrographic toner particles and no additional treatment (such as spray drying as in British Pat. No. 1,237,095) is necessary. The polymerization of olefins, including styrene, in the presence of surface-treated carbon blacks is described in U.S. Pat. Nos. 3,166,541; 3,179,648; 3,202,644; 3,216,990; and 3,221,002. The surface treatment of carbon blacks is expensive and/or treated carbon blacks can require special handling techniques. Therefore, it would be desirable to have a process for suspension polymerizing a styrene-containing monomer composition to produce polymers having more than 40 weight percent styrene moiety in the presence of untreated carbon.

U.S. Pat. No. 3,634,251 issued Jan. 11, 1972, describes a process for the suspension polymerization of a monomer having a polar radical selected from $-NH_2$, $-OH$, $-NO_2$ or halogen in water in the presence of coloring material and an insoluble inorganic fine powder such as calcium hydroxide, calcium carbonate, barrium hydroxide, barrium carbonate, zinc oxide, aluminum oxide, etc., which acts as a dispersion stabilizer. Example 1 of U.S. Pat. No. 3,634,251 describes the polymerization of 20 weight percent p-aminostyrene and 80 weight percent styrene in the presence of carbon black. No mention is made of surface treatment for the carbon black. However, since I have found that aminostyrene and styrene do not polymerize in the presence of untreated carbon black (see examples later in this specification), it must be presumed that treated carbon black was used. Example 2 of U.S. Pat. No. 3,634,251 describes the suspension polymerization of 8 weight percent p-nitrostyrene, 2 weight percent p-chlorostyrene and 90 weight percent styrene in the presence of Spilon Black, a metalized oil-soluble dye. Thus, to my knowledge, no one has described a process for suspension polymerizing a styrene-containing monomer composition in the presence of untreated carbon black to produce polymers having greater than 40 weight percent styrene moiety.

SUMMARY OF THE INVENTION

The present invention provides a suspension polymerization process for polymerizing a styrene-containing monomer composition in the presence of untreated carbon black to produce a polymer comprising more than 40 weight percent of styrene moiety. The process comprises suspending in a continuous liquid phase for polymerization a dispersion comprising the aforementioned monomer composition, initiator and said carbon black, the monomer composition comprising at least one styrene monomer having a substituent with a Hammett sigma value more positive than about 0.06. Examples of suitable substituents include m-methoxy, chloro, m-fluoro, cyano, nitro, and the like.

This invention also provides electrographic toner particles comprising untreated carbon black and a polymer comprising more than 40 weight percent styrene moiety comprising a styrene moiety having a substituent with a Hammett sigma value more positive than about 0.06, said polymer made by suspension polymerization in the presence of said untreated carbon black.

The term "untreated" carbon black, as used herein, means carbon black as supplied by the manufacturer or distributor with no further treatment before use such as, for example, special surface treatment and/or handling under a nitrogen atmosphere.

The term "styrene-containing monomer composition" as used herein refers to a monomer composition composed of one or more styrene monomers and, optionally, one or more additional $\alpha,\beta$-ethylenically unsaturated monomers copolymerizable with said styrene monomers.

The term "styrene moiety" as used herein refers to the repeating unit of a polymer, the unit being derived from polymerizing a styrene monomer.

As used herein the term "styrene monomer" includes both substituted and unsubstituted styrene monomers.

DETAILED DESCRIPTION OF THE INVENTION

It is well known that styrene polymerization is inhibited by oxygen and that care must be taken to remove oxygen from the reaction to achieve polymerization. One way to suspension polymerize styrene in the presence of carbon black is to first treat the carbon black at temperatures greater than 700° C. in an inert atmosphere to remove the adsorbed oxygen. However, the handling of the thermally treated carbon is difficult and has to be done under an inert atmosphere.

I have now found that styrene monomers substituted with electron-withdrawing groups having a Hammett sigma value more positive than about 0.06 will polymerize in the presence of untreated carbon black by suspension polymerization techniques. Although styrene having no electron-withdrawing groups as described above will not suspension polymerize in the presence of untreated carbon black, I have found that a monomer composition comprising styrene monomers having as little as about 5-percent by weight of styrene monomers having a substituent with a Hammett sigma value more positive than about 0.06 will suspension polymerize in the presence of untreated carbon black.

Hammett sigma values for the substituents of the styrene ring can be determined by reference to the published literature or can be determined directly using known determination procedures. Exemplary meta and para sigma values and procedures for their determination are set forth by H. VanBekkum, P. E. Verkade and B. M. Wepster in Rec. Trav. Chim., volume 78, page 815, published 1959; by P. R. Wells in Chem. Revs., volume 63, page 171, published 1963, by H. H. Jaffe, Chem. Revs., volume 53, page 191, published 1953; by M. J. S. Dewar and P. J. Grisdale in J. Amer. Chem. Soc., volume 84, page 3548, published 1962; and by Barlin and Perrin in Quart. Revs., volume 20, page 75 et seq., published 1966.

In accordance with established practice, electron-withdrawing (electronegative) substituents are assigned positive sigma values while electrondonating (electropositive) substituents are assigned negative sigma values. Sigma values for a given substituent are noted to vary as a function of ring position. For example, a given substituent to a phenyl ring can exhibit one sigma value in the meta position and another when in the para position. For the purpose of assigning sigma values in accordance with the teachings of this invention the sigma value for an ortho substituent is considered to be identical to the para position sigma value for that substituent. Certain illustrative Hammett sigma values for phenyl substituents are set forth in Table I.

TABLE I

| Substituent | Hammett Sigma Value | |
| --- | --- | --- |
|  | meta | para |
| $-NH_2$ | $-0.16$ | $-0.66$ |
| $-OCH_3$ | $+0.12$ | $-0.27$ |
| $-H$ | $0.00$ | $0.00$ |
| $-F$ | $+0.34$ | $+0.06$ |
| $-Cl$ | $+0.37$ | $+0.23$ |
| $-CN$ | $+0.61$ | $+0.63$ |
| $-NO_2$ | $+0.71$ | $+0.78$ |

Other $\alpha,\beta$-ethylenically unsaturated comonomers can be copolymerized with the substituted styrene monomers having substituents with a Hammett sigma value more positive than about 0.06 as long as they do not affect the polymerization in the presence of untreated carbon black. Examples of such comonomers useful in the practice of this invention include acrylates, methacrylates, vinyl esters, and the like. Acrylates and methacrylates are especially preferred comonomers because their polymerization is not affected by the presence of carbon.

Any conventional suspension polymerization techniques known to those skilled in the art can be used in the practice of this invention. However, in one embodiment of this invention, it is preferred to use quiescent suspension polymerization techniques such as those described in Lynn, U.S. Pat. No. 2,701,245 issued Feb. 1, 1955, which is hereby incorporated by reference. In this preferred embodiment, I have found that the use of amine oxide surfactants in quiescent suspension polymerization yields spherical particles of narrow size distribution range and with a minimum of ultrafine particles. Typical amine oxide surfactants useful in this embodiment of the invention include, for example, higher alkyl dimethyl amine oxides such as lauryldimethyl amine oxide and myristyldimethyl amine oxide, decyldiethanol amine oxide, acrylamide alkyl-t-amine oxides, and mixtures thereof, and the like. Polymeric amine oxide surfactants are also believed useful such as polyethyleneimine treated with a small amount of hydrogen peroxide to yield some tertiary amine oxide groups in the polymer.

Any conventional polymerization initiator that is known to be useful in suspension polymerization processes can be used in the practice of this invention. Typical examples of such initiators include, for instance, lauryl peroxide, benzoyl peroxide, and the like.

The following procedure is illustrative for the quiescent suspension polymerization process used in a preferred embodiment of the invention. A dispersion of 1.25 g of Sterling R furnace black from the Cabot Corp. in a solution of 0.1 g of t-dodecyl mercaptan in 11.25 g of monomer was prepared by the use of an ultrasonic probe. Lauryl peroxide 0.25 g was then dissolved in the dispersion at 27° C. On solution of the peroxide, the dispersion was suspended in 100 ml of a 1.0% solution of the surfactant in water. The suspension was aided by the use of a Waring Blender coupled to a variable transformer and run at its slowest speed. Stirring was maintained for 10-15 minutes at 27° C. The suspension was then transferred to a large flask and allowed to stand at 50° C. for 16-18 hrs. During this time polymerization was completed and the toner particles had settled to the bottom of the flask. The toner was collected by centrifugation, washed with water, and dried for 16-18 hrs at 50° C. in a vacuum oven. The dried toner thus obtained was broken up and sieved through a 400 mesh sieve to remove any aggregates caused by drying.

I have found that, by using the process of quiescent suspension polymerization with amine oxide surfactants such as that described above, I can provide spherical particles wherein 0.2% of said particles are less than 1 micron and 100-98% of the particles are 1-20 microns in size. Typically 100-90% of these particles are from about 1-12 microns in diameter. The quiescent suspension polymerization process described above will yield comparable results when using a variety of $\alpha,\beta$-ethylenically unsaturated monomers and polymerizing in a wide variety of colorants, including dyes and pigments.

The suspension polymerization techiques of this invention are useful in preparing finely-divided toner particles useful in electrographic processes. Such toner compositions typically are composed of a resinous binder material and a colorant such as a pigment or dye. Various other addenda such as charge control agents, etc. may also be incorporated in such toner compositions. Generally, these toner compositions have an average particle size within the range of from about 0.1 micron to about 100 microns. Depending upon the particular electrographic or electrophotographic process in which such toner particles are to be utilized, it is generally desirable to utilize a toner composition having an average particle size within a fairly narrow range of the larger generally useful 0.1 micron to 100 micron particle size range noted above. For example, if it is desired to utilize a toner composition having an average particle size of from about 1 to about 30 microns, it is desirable to utilize a toner composition wherein as many as possible of the individual toner particles is within the 1 to 30 micron size range. On the other hand, if it is desirable to utilize a toner composition having an average particle size within the range of from about 50 to about 75 microns, it is desirable to utilize a toner composition wherein a maximum number of the individual toner particles have a size within the 50 to 75 micron range.

This invention is further illustrated by the following examples.

GENERAL PROCEDURE FOR POLYMERIZATION

A dispersion of the carbon black in the monomer-initiator solution was prepared using an ultrasonic horn. This dispersion was then suspended in an aqueous phase containing Methocel ® (a treated carbohydrate polymer available from Dow Chemical Company) as the surfactant thickener. The suspension was obtained by shearing in a Waring Blender whose speed was controlled by a variable transformer at its lowest speed. After shearing for a short time (about 10 to 15 minutes) the suspension was transferred to a stoppered flask and placed overnight in a 50°-60° C. bath. The following day the supernatent was decanted from the toner particles which were formed during the night and the toner particles were washed three times with fresh water. The toner particles were collected by centrifuging after each washing. Finally, the toner particles were dried overnight in a vacuum oven at 50° C.

The quantities of starting materials used in typical preparations are given below:

| Preparation A | |
|---|---|
| m-Nitrostyrene | 20.0 g |
| lauryl peroxide | 1.7 g |
| Regal 300 (untreated carbon black available from Cabot Corporation) | 0.6 g |
| Preparation B | |
| m-Fluorostyrene | 20.0 g |
| lauryl peroxide | 1.7 g |
| Regal 300 | 0.6 g |
| Preparation C | |
| p-Cyanostyrene | 12.0 g |
| lauryl peroxide | 1.0 g |
| Regal 300 | 0.4 g |
| Preparation D | |
| m-Methoxystyrene | 12.0 g |
| lauryl peroxide | 1.0 g |
| Regal 300 | 0.4 g |
| Preparation E | |
| Styrene | 10.0 g |
| lauryl peroxide | 0.9 g |
| Regal 300 | 0.3 g |

The above monomer-initiator-carbon black preparations were then dispersed in an aqueous phase of 100 ml of $H_2O$ containing 1.0 g of Methocel ® 10.

EXAMPLES 1-11

A number of suspension polymerization processes were run using various substituted styrene monomers as starting materials and reacting in the presence of untreated carbon black in accord with the procedure described above. Table II shows the results of these experiments indicating whether or not polymer was formed.

TABLE II

| No. | Substituent | Hammett sigma value | Formation of Polymer |
|---|---|---|---|
| 1 | —$NH_2$ (para) | −0.66 | no |
| 2 | —$OCH_3$ (para) | −0.27 | no |
| 3 | —H | 0.00 | no |
| 4 | —F (para) | +0.06 | no |
| 5 | —Cl (para) | +0.23 | yes |
| 6 | —CN (para) | +0.63 | yes |
| 7 | —$NO_2$ (para) | +0.78 | yes |
| 8 | —$OCH_3$ (meta) | +0.12 | yes |
| 9 | —Cl (meta) | +0.37 | yes |
| 10 | —F (meta) | +0.34 | yes |
| 11 | —$NO_2$ (meta) | +0.71 | yes |

EXAMPLE 12

Commercial cholorostyrene (available from Dow Chemical Co.) containing from 60 to 71 percent ortho isomer was suspension polymerized in the presence of untreated carbon black by the same procedure as used in Examples 1-11 using various carbon blacks as supplied by the manufacturer. The preparation for polymerization contained the following ingredients:

Chlorostyrene: 20.0 g
Lauryl peroxide: 1.7 g
Untreated carbon black: 0.6 g
Methocel ® 10: 1.0 g Carbon blacks used were Regal 300R, Sterling FT and Sterling R, all available from Cabot Corporation, and Molacco H available from Columbian Carbon Industries. Polymer was formed in all cases.

EXAMPLE 13

Using the same procedure as above, suspension polymerizations were conducted using Regal 300R, lauryl peroxide and mixtures of monomers containing various percentages of styrene monomer and styrene substituted with electron withdrawing groups in accord with this invention. The results are reported in Table III below.

TABLE III

| Monomer Mixture | | Formation |
|---|---|---|
| Styrene | Chlorostyrene | of Polymer |
| 10 g | 10 g | yes |
| 15 g | 5 g | yes |
| 18 g | 2 g | yes |
| 19 g | 1 g | yes |
| 20 g | 0 | no |

Thus, it can be seen that mixtures of styrene monomers containing as low as about 5 percent of a styrene monomer having a substituent with a Hammett sigma value more positive than about 0.06 will polymerize in the presence of untreated carbon black.

The invention has been described in detail with particular reference to certain preferred embodiments thereof, but it will be understood that variations and modifications can be effected within the spirit and scope of the invention.

I claim:

1. A suspension polymerization process for polymerizing in the presence of untreated carbon black containing absorbed oxygen a polymer comprising more than 40 weight percent styrene moiety which comprises suspending in a continuous liquid phase for polymerization a dispersion comprising monomer, initiator and said carbon black, said monomer comprising styrene moiety having a substituent with a Hammett sigma value more positive than about 0.06.

2. A suspension polymerization process as described in claim 1 wherein said substituent is selected from the group consisting of chloro, cyano, nitro, m-fluoro, and m-methoxy.

3. A suspension polymerization process as described in claim 1 wherein said dispersion is suspended in an aqueous phase containing an amine oxide surfactant.

4. A suspension polymerization process as described in claim 1 wherein said monomer comprises styrene moiety in which at least about 5 percent by weight of said styrene moiety is styrene moiety having a substituent with a Hammett sigma value more positive than 0.06.

* * * * *